UNITED STATES PATENT OFFICE.

MAX BUCHNER, OF HANOVER, GERMANY, ASSIGNOR, BY MESNE ASSIGNMENTS, TO THE CHEMICAL FOUNDATION, INC., A CORPORATION OF DELAWARE.

METHOD FOR PRODUCING HYDROXIDS OF METALS BY PRECIPITATING METALLIC SALTS WITH AMMONIA.

1,386,920.      Specification of Letters Patent.      Patented Aug. 9, 1921.

No Drawing.      Application filed December 24, 1917. Serial No. 208,705.

*To all whom it may concern:*

Be it known that I, MAX BUCHNER, a subject of the German Empire, and resident of Hanover, Germany, have invented certain new and useful Improvements in Methods for Producing Hydroxids of Metals by Precipitating Metallic Salts with Ammonia; for which I have filed an application in Germany, July 22, 1916; and I do hereby declare the following to be a full, clear, and exact description of the invention, such as will enable others skilled in the art to which it appertains to make and use the same.

When precipitating solutions of metallic salts with ammonia in the preparation of hydroxids of metals the practice heretofore has been to employ equivalent amounts. This procedure has been well established in the case of hydroxids of the metals which are soluble in an excess of ammonia, with a view to avoiding losses in metal.

It was generally concluded that by the use of this method pure hydroxids of metals were formed, and consequently this mode of working has been adhered to, though, as a rule, it produces colloidal, gelatinous and difficultly filterable precipitates.

The precipitates thus obtained, for instance the hydroxid of aluminium from the sulfate, were considered to be a mixed product consisting of the pure hydroxid and ammoniacal salts. The ammonium salts were thought to be capable of being readily removed by washing, as they were supposed to be present in mechanical mixture only.

It has, however, been ascertained by exhaustive experiments that, for example, in the preparation of aluminium-hydroxid, mixtures of the pure hydroxid of aluminium and ammonium salts were not obtained, but instead, complex aluminium combinations resulted wherein the sulfate of ammonium and the original aluminium salt were in part firmly united. By way of example, I have found that in hydroxid of aluminium prepared from the sulfate of aluminium there are complex combinations with sulfates, which involve the ammonia.

When sulfate of aluminium is precipitated with an equal bulk of concentrated solution of ammonia, a precipitate of the hydroxid is obtained containing 10 to 15% $SO_3$ and about 4% $NH_3$.

I have discovered that both the structure of the precipitate and its composition become more satisfactory if, instead of using the chemical equivalent of ammonia, an amount of ammonia which is several times that chemically equivalent to the metal present, *i. e.*, not a small but a large surplus, a multiple equivalent of ammonia, is used for the precipitation. Then sandy, granular, perfectly-washable precipitates develop, without any formation of undesirable, complex materials taking place. The tendency to retain ammonia in free or combined condition ceases. When the surplus proportions are not even very pronounced, unappreciable quantities of sulfate remain, which, as compared with the behavior of the complex formations arising under normal conditions, are remarkable for their easy removability during calcination. In cases where, during precipitation, the ammonia addition is three to four times that of the chemical equivalent of the metal present, the percentage of fate is reduced to a fully negligible amou Thus, the essential feature of the present invention consists in bringing into action a quantity of ammonia which is a multiple or manifold quantity of the ammonia theoretically required for precipitation, whether in the form of a solution of ammonia or a gas. Ammonia solution should be used supercentrated in ammonia.

In the case of aqueous ammonia solutions the main distinctive points of the invention become perceptible when a quadruple surplus is used, whereas in the case of gaseous ammonia it is advantageous to employ seven-fold or even a greater surplus. The further increase of the surplus entails a decrease of the inconveniences set forth above.

In using my improved method it is a matter of indifference in what form the metallic salts, to be transformed, are employed. The high excess does away with the differences which under normal conditions come into consideration, according to the composition of the salts to be precipitated. In accordance with the invention dry salts can be transformed into hydroxid, providing the required hydroxyl-water is present, either in the form of water of crystallization, or supplied along with the gaseous ammonia.

Among others, my invention presents, technically, the great advantage that the precipitates do not carry down sulfates and thus a loss of sulfuric acid is prevented. On the other hand, the surplus of ammonia does not imply a reduced economy, as it can be re-used.

The method is particularly satisfactory for aluminium salts. It is not, however, suitable for the metallic hydroxids, for instance, hydroxid of zinc, which are readily soluble in an excess of ammonia.

I claim—

A method of producing hydroxids of metals which are substantially insoluble in ammonia, which comprises allowing ammonia in an amount which is several times the chemical equivalent of the metal present to act upon a metallic salt in the presence of water.

In testimony that I claim the foregoing as my invention, I have signed my name in presence of two subscribing witnesses.

Dr. MAX BUCHNER.

Witnesses:
 Dr. HANS-HIRSCH,
 M. BÄRFELT.